(12) United States Patent
Moon

(10) Patent No.: US 11,743,924 B2
(45) Date of Patent: Aug. 29, 2023

(54) MESSAGE TRANSMISSION REQUESTING APPARATUS AND METHOD, MESSAGE TRANSMISSION MANAGEMENT SERVER, AND BASE STATION

(71) Applicants: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

(72) Inventor: Hi Chan Moon, Seoul (KR)

(73) Assignees: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

( * ) Notice: Subject to any disclaimer, the term of this patent is extended or adjusted under 35 U.S.C. 154(b) by 127 days.

(21) Appl. No.: 17/257,494

(22) PCT Filed: Jul. 3, 2019

(86) PCT No.: PCT/KR2019/008138
§ 371 (c)(1),
(2) Date: Dec. 31, 2020

(87) PCT Pub. No.: WO2020/009472
PCT Pub. Date: Jan. 9, 2020

(65) Prior Publication Data
US 2021/0282128 A1 Sep. 9, 2021

(30) Foreign Application Priority Data

Jul. 3, 2018 (KR) .................. 10-2018-0076925
Jul. 12, 2018 (KR) .................. 10-2018-0081013
(Continued)

(51) Int. Cl.
*H04W 72/51* (2023.01)
*H04B 17/318* (2015.01)
(Continued)

(52) U.S. Cl.
CPC .......... *H04W 72/51* (2023.01); *H04B 17/318* (2015.01); *H04W 24/10* (2013.01);
(Continued)

(58) Field of Classification Search
CPC . H04W 72/048; H04W 24/10; H04W 64/006; H04W 72/0413; H04W 72/042;
(Continued)

(56) References Cited

U.S. PATENT DOCUMENTS 8,107,435 B1 * 1/2012 Singh ................. H04W 36/30
370/428
9,526,108 B2 * 12/2016 Chang ................ H04W 72/082
(Continued)

FOREIGN PATENT DOCUMENTS

CN 101895816 A 11/2010
CN 104394066 A 3/2015
(Continued)

OTHER PUBLICATIONS

International search report for PCT/KR2019/008138 dated Oct. 8, 2019.

*Primary Examiner* — Brian T O'Connor
(74) *Attorney, Agent, or Firm* — Sughrue Mion, PLLC

(57) ABSTRACT

The present disclosure relates to a message transmission requesting apparatus and method for requesting message transmission from a terminal located within a predetermined range from the message transmission requesting apparatus, a message transmission management server, and a base station. Specifically, the message transmission requesting apparatus comprises: an uplink resource allocation informa-
(Continued)

tion acquisition unit for acquiring uplink resource allocation information; at least one uplink signal reception unit for receiving an uplink signal on the basis of the uplink resource allocation information; a control unit for determining, on the basis of the uplink signal, information on a terminal which has transmitted the uplink signal, the information including identifier information of the terminal and location information of the terminal; and a message transmission request unit for transmitting the information on the terminal to a base station.

16 Claims, 11 Drawing Sheets

(30) Foreign Application Priority Data

| | | |
|---|---|---|
| Oct. 15, 2018 | (KR) | ........................ 10-2018-0122514 |
| Jul. 2, 2019 | (KR) | ........................ 10-2019-0079710 |

(51) Int. Cl.

| | |
|---|---|
| *H04W 76/11* | (2018.01) |
| *H04W 24/10* | (2009.01) |
| *H04W 64/00* | (2009.01) |
| *H04W 72/0446* | (2023.01) |
| *H04W 72/0453* | (2023.01) |
| *H04W 72/21* | (2023.01) |
| *H04W 72/23* | (2023.01) |

(52) U.S. Cl.
CPC ..... *H04W 64/006* (2013.01); *H04W 72/0446* (2013.01); *H04W 72/0453* (2013.01); *H04W 72/21* (2023.01); *H04W 72/23* (2023.01); *H04W 76/11* (2018.02)

(58) Field of Classification Search
CPC ......... H04W 72/0446; H04W 72/0453; H04W 76/11; H04W 88/085; H04W 64/00; H04W 72/0493; H04B 17/318
See application file for complete search history.

(56) References Cited

U.S. PATENT DOCUMENTS

| | | | |
|---|---|---|---|
| 9,549,394 B2* | 1/2017 | Kim | .................. H04W 8/005 |
| 10,028,264 B2 | 7/2018 | Lee et al. | |
| 10,743,298 B2 | 8/2020 | Yasukawa et al. | |
| 11,064,314 B2* | 7/2021 | Moon | .................. H04W 72/21 |
| 11,564,060 B2* | 1/2023 | Moon | .................. H04W 72/23 |
| 2014/0161024 A1 | 6/2014 | Speight et al. | |
| 2015/0201394 A1* | 7/2015 | Qu | .......................... H04W 4/20 |
| | | | 455/456.1 |
| 2015/0249979 A1 | 9/2015 | Kim et al. | |
| 2016/0278053 A1 | 9/2016 | Lee et al. | |
| 2016/0302114 A1* | 10/2016 | Jain | ...................... H04B 1/3816 |
| 2017/0055282 A1* | 2/2017 | Sadiq | .................... H04W 88/04 |
| 2018/0160418 A1 | 6/2018 | Luo et al. | |
| 2018/0176882 A1* | 6/2018 | Ramkumar | ........... H04W 88/04 |
| 2019/0174466 A1* | 6/2019 | Zhang | ..................... H04L 5/005 |
| 2019/0387548 A1 | 12/2019 | Kim | |

FOREIGN PATENT DOCUMENTS

| | | |
|---|---|---|
| CN | 104883339 A | 9/2015 |
| CN | 107919948 A | 4/2018 |
| CN | 108029072 A | 5/2018 |
| EP | 3111684 A1 | 1/2017 |
| EP | 3843485 A1 | 6/2021 |
| JP | 2016-500214 A | 1/2016 |
| KR | 10-2014-0031238 A | 3/2014 |
| KR | 10-2014-0080298 A | 6/2014 |
| KR | 10-2015-0106959 A | 9/2015 |
| KR | 10-2016-0078344 A | 7/2016 |
| KR | 10-2018-0058185 A | 5/2018 |
| WO | 2017/080782 A1 | 5/2017 |

\* cited by examiner

FIG.9

| Operator ID | Frequency band | Base station location information (cell ID) | Terminal RNTI | Terminal detection time | Caller ID | Message | ary MESSAGE TRANSMISSION REQUESTING APPARATUS AND METHOD, MESSAGE TRANSMISSION MANAGEMENT SERVER, AND BASE STATION

CROSS-REFERENCE TO RELATED APPLICATIONS

This application is a National Stage of International Application No. PCT/KR2019/008138 filed Jul. 3, 2019, which claims priority from Korea Patent Application No. KR10-2018-0076925 filed on Jul. 3, 2018, KR10-2018-0081013 filed on Jul. 12, 2018, KR10-2018-0122514 filed on Oct. 15, 2018, and KR10-2019-0079710 filed on Jul. 2, 2019.

TECHNICAL FIELD

The present disclosure relates to apparatuses and methods for requesting a message transmission, message transmission management servers, and base stations, and more specifically, to an apparatus and a method of performing a request for a message transmission to a terminal located within a predetermined range of distances from a message transmission request apparatus, a message transmission management server and a base station associated with this.

BACKGROUND ART

It is necessary to identify an address of a terminal to transmit a message to the terminal in a mobile communication system. Generally, an international mobile subscriber identity (IMSI) and a temporary mobile subscriber identity (TMSI) may be used for addressing a message to be transmitted to a specific terminal in a mobile communication system.

The IMSI is a unique identifier (ID) globally used for identifying a subscriber. FIG. 1 illustrates a configuration of the ISMI. The IMSI is made up of a mobile country code (MCC) of 3 digits, a mobile network code (MNC) of 3 digits, a mobile subscriber identity number (MSIN) within 10 digits.

However, if the IMSI is transmitted and opened over the air, this may cause significant problems in security and the like. To solve these problems, the TMSI is widely used for addressing a terminal. The TMSI is a temporary number assigned to a terminal in a certain area, and is changed when the terminal moves into another area. That is, the TMSI is not a permanently assigned number, and can be changed due to a movement of a terminal, a network management, and the like. A visitor location register (VLR) in a mobile communication network manages a table between the IMSI and the TMSI. A P-TMSI denotes a TMSI assigned to a terminal in a packet communication network. A globally unique temporary identifier (GUTI) can be generated by combining the TMSI and a unique number of a mobile communication network.

DETAILED DESCRIPTION OF THE INVENTION

Technical Problem

In accordance with aspects of the present disclosure, a method is provided of performing a request for a message transmission to unspecified terminals without acquiring personal information of the unspecified terminals located within a certain range of distances from a message transmission request apparatus.

Technical Solution

In accordance with one aspect of the present disclosure, a message transmission request apparatus is provided that comprises an uplink resource assignment information acquisition unit acquiring uplink resource assignment information, at least one uplink signal receiver receiving an uplink signal based on the uplink resource assignment information, a controller determining, based on the uplink signal, information on a terminal which has transmitted the uplink signal, the information including identifier information of the terminal and location information of the terminal, and a message transmission request unit transmitting the information on the terminal to a base station.

In accordance with another aspect of the present disclosure, a message transmission request apparatus is provided that comprises an uplink resource assignment information acquisition unit acquiring uplink resource assignment information, at least one uplink signal receiver receiving an uplink signal based on the uplink resource assignment information, a controller determining information on a terminal which has transmitted the uplink signal based on the uplink signal, and a message transmission request unit transmitting, to a base station, a message transmission request signal so that the base station can transmit a message to the terminal based on the information on the terminal.

In accordance with further another aspect of the present disclosure, a message transmission request method is provided that comprises an uplink resource assignment information acquisition step of acquiring uplink resource assignment information, an uplink signal reception step of receiving an uplink signal based on the uplink resource assignment information, a step of determining information on a terminal which has transmitted the uplink signal based on the uplink signal, and determining whether a message transmission to the terminal is required based on the information on the terminal, and when it is determined that the message transmission to the terminal is required, a message transmission request step of transmitting, to a base station, a message transmission request signal so that the base station can transmit the message to the terminal.

In accordance with yet another aspect of the present disclosure, a message transmission management server is provided that comprises a receiver receiving uplink signal reception intensity information on an uplink signal received by each of at least one message transmission request apparatus from the at least one message transmission request apparatus, a controller determining a location of a terminal which has transmitted the uplink signal based on the uplink signal reception intensity information on the uplink signal received by each of the at least one message transmission request apparatus, and a transmitter transmitting information on the location of the terminal to the at least one message transmission request apparatus.

Effects of the Invention

In accordance with aspects of the present disclosure, a message can be transmitted to an adjacent terminal without affecting existing communication networks or acquiring IMSI or TMSI information of the terminal.

BRIEF DESCRIPTION OF THE DRAWINGS

FIG. 9 illustrates the configuration of a message transmission request signal transmitted by a message transmission request apparatus according to aspects of the present disclosure.

BEST MODE FOR CARRYING OUT THE INVENTION

Figure 1:
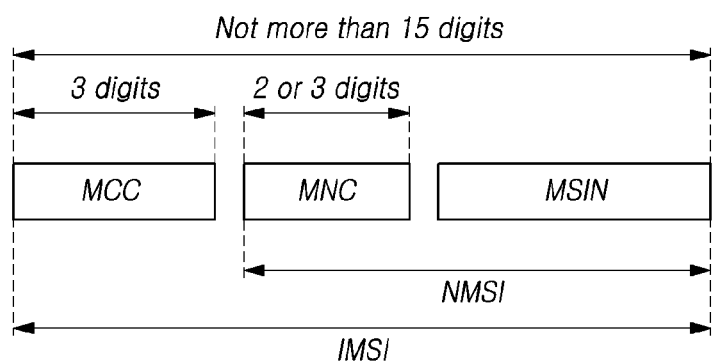
FIG. 1 illustrates a configuration of the ISMI.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, detailed discussions on known functions and configurations incorporated herein may be omitted when it is needed to focus on the subject matter of the present disclosure.

In the present disclosure, a wireless communication system denotes a system for providing various communication services such as a voice communication service, a packet data service, etc. The wireless communication system includes a terminal (includes a user device or a user equipment (UE)) and a base station (BS).

The terminal is a generic term referring to devices used in wireless communication. For example, the terminal may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally denote a station communicating with the terminal. The base station or cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of these various cells is controlled by a base station. Therefore, the base station may be classified into two types. 1) One type of the base station may denote an apparatus providing a megacell, a macrocell, a microcell, a picocell, a femtocell, or a small cell that forms a communication service area, and 2) the other type of the base station may denote the communication service area. Apparatuses that form and provide a certain radio area, and that are controlled by one or more identical entities or that interact with one another for enabling two or more entities to cooperate with one another to provide the radio area may be referred to as the type 1) base station. According to a scheme of forming and providing a communication service area, a point, a transmission/reception point, a transmission point, a reception point, or the like is an example of this type of base station. A communication service area itself to which a terminal or a neighboring base station transmits a signal or from which the terminal or the neighboring base station receives a signal may be denoted as the type 2) base station.

In the present disclosure, the cell may denote a coverage of a signal transmitted from a transmission/reception point, a component carrier having a coverage of a signal transmitted from a transmission point or a transmission/reception point, or a transmission/reception point itself.

The terminal and the base station herein are entities for performing two types of transmissions or receptions (uplink and downlink) used to embody embodiments, examples, technologies, or technical ideas described in the present disclosure. Thus, the terminal and the base station herein include all entities capable of performing such operations and are not limited to specific terms or words.

Herein, the uplink (hereinafter, referred to as "UL") refers to data transmission/reception by a UE to/from a base station, and the downlink (hereinafter, referred to as "DL") refers to data transmission/reception by a base station to/from a UE.

An uplink transmission and a downlink transmission may be performed using a time division duplex (TDD) technique in which a transmission can be performed at a time different from another transmission, a frequency division duplex (FDD) technique in which a transmission can be performed at a frequency different from another transmission, or a hybrid technique of the frequency division duplex (FDD) and the time division duplex (TDD).

Further, in a standard for a wireless communication system, uplink and downlink are configured based on a single carrier or a pair of carriers.

Control information is transmitted in the uplink and/or the downlink configured with a control channel, such as a physical downlink control channel (PDCCH), a physical uplink control channel (PUCCH), and the like, and Data are transmitted in the uplink and/or the downlink configured with a data channel, such as a physical downlink shared channel (PDSCH), a physical uplink shared channel (PUSCH), and the like.

The downlink may denote communication or a communication path from multiple transmission/reception points to a terminal, and the uplink may denote communication or a communication path from the terminal to the multiple transmission/reception points. In the downlink, a transmitter may be a part of multiple transmission/reception points, and a receiver may be a part of a terminal. In the uplink, a transmitter may be a part of a terminal and a receiver may be a part of multiple transmission/reception points.

Hereinafter, a situation where a signal is transmitted or received through a channel such as the PUCCH, the PUSCH, the PDCCH, or the PDSCH, may be expressed as the transmission or reception of the PUCCH, the PUSCH, the PDCCH, or the PDSCH.

Meanwhile, higher layer signaling herein includes radio resource control (RRC) signaling transmitting RRC information containing an RRC parameter.

A base station performs a downlink transmission to terminals. The base station may transmit a physical downlink control channel for transmitting i) downlink control information, such as scheduling required to receive a downlink data channel that is a primary physical channel for a unicast transmission, and ii) scheduling approval information for a transmission through an uplink data channel. Hereinafter, transmitting/receiving a signal through each channel may be described in such a manner that a corresponding channel is transmitted/received.

Any of multiple access techniques applied to wireless communication systems may be applicable to a wireless communication system of the present disclosure. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments or examples described in the present disclosure may be applicable to resource assignment in both an asynchronous wireless communication evolving into LTE/LTE-advanced and IMT-2020 from GSM, WCDMA, and HSPA, and a synchronous wireless communication evolving into code division multiple access, CDMA-2000, and UMB.

In the present disclosure, a machine type communication (MTC) terminal may denote a terminal supporting low costs (or low complexity), a terminal supporting coverage enhancement, or the like. As another example, the MTC terminal may denote a terminal defined as a predetermined category for supporting low cost (or low complexity) and/or coverage enhancement.

In other words, the MTC terminal herein may denote a low cost (or low complexity) user equipment category/type newly defined in 3GPP Release-13 and performing LTE-based MTC-related operations. The MTC terminal may denote a user equipment category/type defined in or before 3GPP Release-12, which supports enhanced coverage in comparison with the typical LTE coverage or supports low power consumption. The MTC terminal may also denote a low cost (or low complexity) user equipment category/type newly defined in Release-13. The MTC terminal may denote a further enhanced MTC terminal defined in Release-14.

In the present disclosure, a NarrowBand Internet of Things (NB-IoT) terminal denotes a terminal supporting radio access for cellular IoT. NB-IoT technology has been developed to provide improved indoor coverage, support for large-scale low-speed terminals, low latency sensitivity, very low terminal costs, low power consumption, and optimized network architecture.

An enhanced mobile broadband (eMBB), massive machine-type communication (mMTC), and ultra-reliable and low latency communication (URLLC) are proposed as representative usage scenarios for NR having been discussed in the 3GPP recently.

In the present disclosure, a frequency, a frame, a sub-frame, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

In accordance with embodiments of the present disclosure, in a wireless communication system, particularly, in a mobile communication system, a method is provided of transmitting a message to terminals placed around a specific location. In particular, a method is provided for transmitting a message without acquiring personal information, such as a phone number and an IMSI of the terminals and the like.

A message transmission request apparatus according to embodiments of the present disclose includes an uplink resource assignment information acquisition unit, an uplink signal receiver, a controller, and a message transmission request unit. The uplink resource assignment information acquisition unit receives RNTI information that is a temporary ID of a terminal and information on uplink resource assignment in a mobile communication system, and based on these, the uplink signal receiver receives an uplink signal in the mobile communication system. The controller determines whether the terminal is located in the vicinity of the message transmission request apparatus based on the received signal, and when the terminal is placed within a predetermined distance, the message transmission request unit performs a request for a message transmission to the terminal. The uplink resource assignment information acquisition unit in the present disclosure may be implemented by using a downlink signal receiver of the mobile communication system.

In one embodiment, the message transmission request apparatus may include a signal receiver in which a downlink signal receiver and an uplink signal receiver are implemented together. The signal receiver may include one or more uplink signal receivers, and in this case, each uplink signal receiver may be installed in a physical location different from one another. Further, the message transmission request apparatus according to embodiments of the present disclosure may include a message transmission request unit capable of communicating with a wireless communication system, particularly, a mobile communication system. The message transmission request unit can be used for requesting an adjacent base station to transmit a message.

The signal receiver according to this embodiment can acquire information on one or more signals that may be transmitted from a terminal to a base station through uplink by analyzing a downlink signal transmitted by the base station. Further, the message transmission request apparatus can determine, through an uplink signal receiver, whether the data of the uplink are transmitted from the terminal to the base station, and determine whether the terminal is placed in the vicinity of the message transmission request apparatus. Further, when the terminal satisfies a predetermined message transmission condition, the message transmission request unit of the present disclosure requests a mobile communication network to transmit a message to the terminal.

Embodiments of the present disclosure relate to apparatuses and methods for identifying terminals in the vicinity of a specific location in a wireless communication system and then transmitting a message to the terminals.

Devices, apparatuses, and methods to which embodiments of the present disclosure are applicable related to a message transmission through a wireless communication system.

Embodiments of the present disclosure are expected to be applied to a transmission of public information in a specific public place, a transmission of living information, a commercial advertisement and the like.

A related technology that is closely associated with the embodiments or examples of the present disclosure is mobile communication systems.

Hereinafter, embodiments of the present disclosure will be discussed in detail with reference to accompanying drawings. Further, in describing embodiments of the present disclosure, detailed discussions on known functions and configurations incorporated herein may be omitted when it is needed to focus on the subject matter of the present disclosure. The terms described below are terms defined considering embodiments, examples, and technical ideas in the present disclosure, and may be differently expressed according to intentions or customs of a user, an operator, or the like. Thus, such definition should be interpreted based on the context of the present disclosure Meanwhile, each of embodiments or examples described below may be applicable individually or in any combination with one or more other embodiments or examples.

Figure 2:
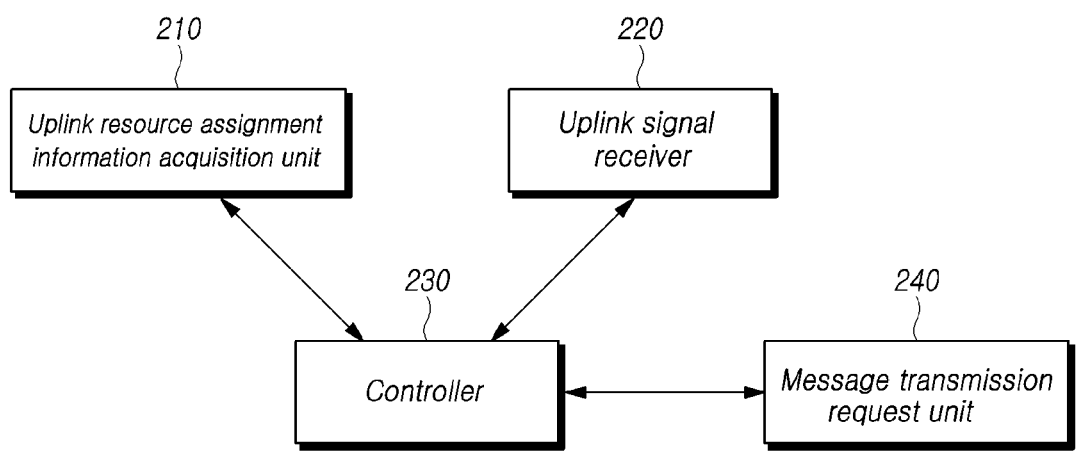
FIG. 2 illustrates a message transmission request apparatus according to one aspect of the present disclosure.

FIG. 2 illustrates a message transmission request apparatus according to one aspect of the present disclosure.

In accordance with one aspect of the present disclosure, the message transmission request apparatus includes an uplink resource assignment information acquisition unit 210 acquiring uplink resource assignment information, one or more uplink signal receiver(s) 220 receiving an uplink signal based on the uplink resource assignment information, a controller 230 determining, based on the uplink signal, information on a terminal which has transmitted the uplink signal, the information including identifier information of the terminal and location information of the terminal, and a message transmission request unit 240 transmitting the information on the terminal to a base station.

In accordance with another aspect of the present disclosure, the message transmission request apparatus includes the uplink resource assignment information acquisition unit 210 acquiring uplink resource assignment information, one or more uplink signal receivers 220 receiving an uplink signal based on the uplink resource assignment information, the controller 230 determining information on a terminal which has transmitted the uplink signal based on the uplink signal, and the message transmission request unit 240 transmitting, to a base station, the message transmission request signal so that the base station can transmit a message to the terminal based on the information on the terminal.

The uplink resource assignment information acquisition unit 210 of the message transmission request apparatus of the present disclosure acquires uplink resource assignment information.

In some embodiments, the uplink resource assignment information acquisition unit 210 can acquire a downlink signal transmitted by a base station for resource assignment to terminals through one or more downlink signal receivers, and then acquire the uplink resource assignment information by processing the acquired downlink signal. In some embodiments, the uplink resource assignment information acquisition unit 210 may be implemented by using a downlink signal receiver. That is, the uplink resource assignment information acquisition unit 210 can receive a downlink signal, and acquire the uplink resource assignment information by processing the received downlink signal. In this case, the received information may include an RNTI of a terminal, an assigned resource, an uplink transmission format including a modulation and coding scheme (MCS), and the like.

In accordance with further another embodiment of the present disclosure, a mobile communication base station or a mobile communication network may be allowed to directly transmit the uplink resource assignment information to the apparatus of the present disclosure. In the embodiment described above, discussions have been conducted on the case where the apparatus of the present disclosure acquires resource assignment information transmitted by a base station to terminals. However, in this embodiment, the mobile communication base station or the mobile communication network directly transmits uplink resource assignment information of all or a part of terminals communicating in a corresponding cell to the apparatus of the present disclosure. In this case, RNTI information of the terminals may be transmitted together. Wireless communication as well as wired communication may be used as a communication method between the base station and the apparatus of the present disclosure.

One or more uplink signal receivers 220 of the message transmission request apparatus of the present disclosure can receive an uplink signal based on the uplink resource assignment information. Further, the controller 230 determines whether to transmit a message to a terminal based on information on the terminal. Specifically, the controller 230 determines whether the terminal is placed within a predetermined distance from the message transmission request apparatus based on a signal intensity of a received signal, information obtained by demodulating the received signal, and the like. In this process, a location of the terminal can be more accurately detected using direction information in which an uplink is received. To do this, a location of the terminal can be more accurately detected by using a directional antenna and measuring a direction in which a signal is received. Further, the controller 230 can determine whether the terminal determined as being placed within a predetermined distance from the message transmission request apparatus satisfies a message transmission condition set in advance.

When it is determined that a message transmission is required to a terminal, that is, when the preset message transmission condition is satisfied, the message transmission request unit 240 of the message transmission request apparatus of the present disclosure transmits a message transmission request signal to a corresponding base station so that the base station can transmit the message to the terminal. Configurations of the message transmission request apparatus of the present disclosure are devices or units for communicating with a mobile communication system and may be implemented wirelessly or through a wired connection.

The message transmission request apparatus according to embodiments of the present disclosure acquires resource assignment information and RNTI information on terminals through a downlink receiver, and based on these, determines whether the terminals are placed within a certain distance by measuring uplink signals of the terminals. The downlink uses a frequency band in which control information on the uplink is transmitted. Further, the apparatus of the present disclosure determines a time point at which an uplink signal may be received based on a time point at which a downlink signal is received.

Figure 3:
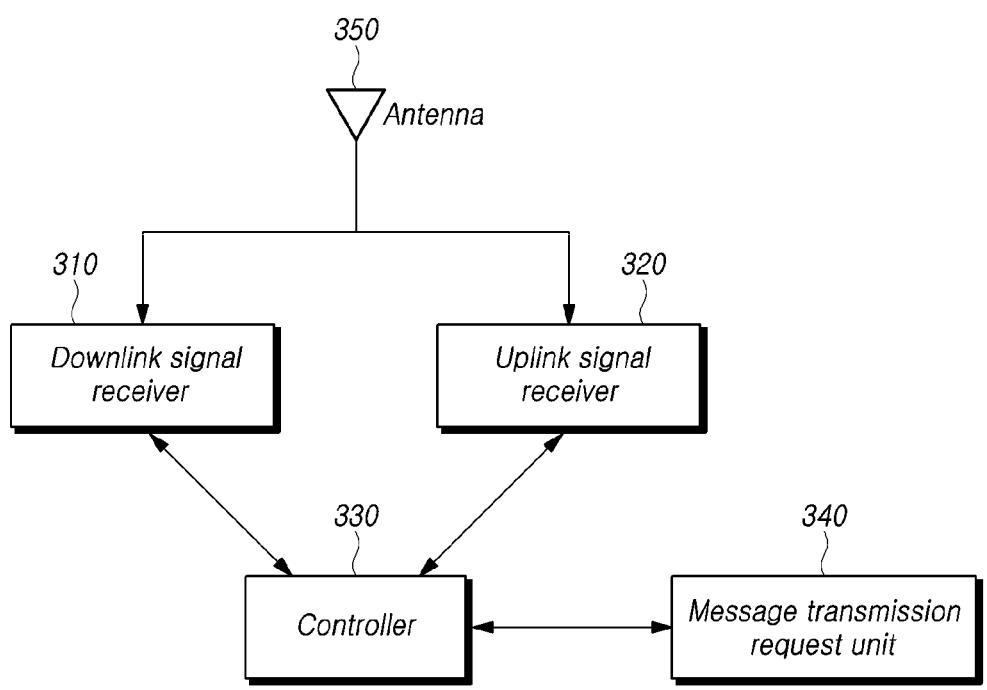
FIG. 3 illustrates a message transmission request apparatus according to another aspect of the present disclosure.
Figure 4:
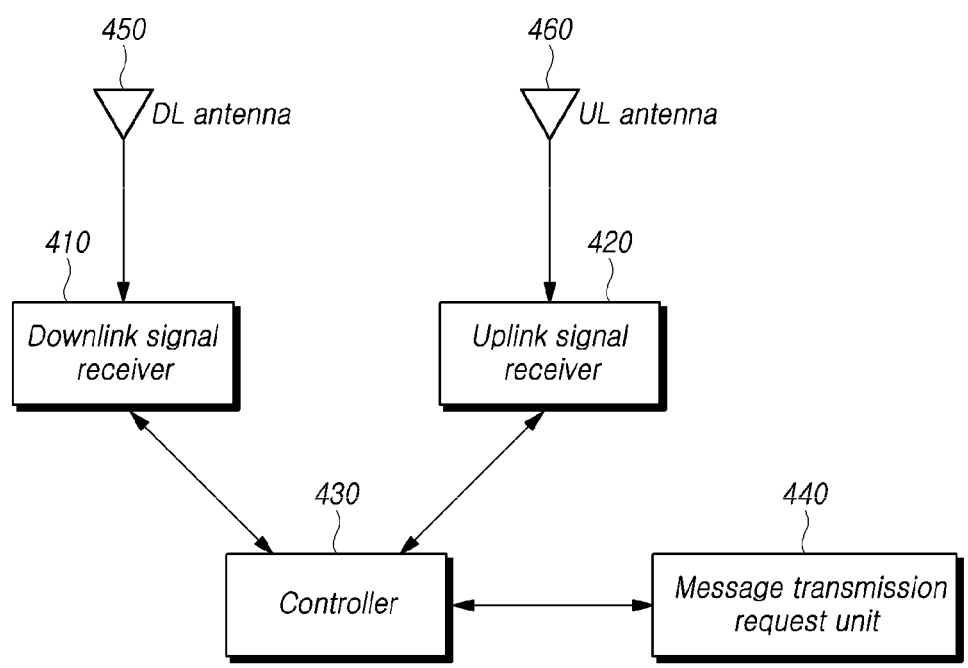
FIG. 4 illustrates a message transmission request apparatus according to further another aspect of the present disclosure.
Figure 5:
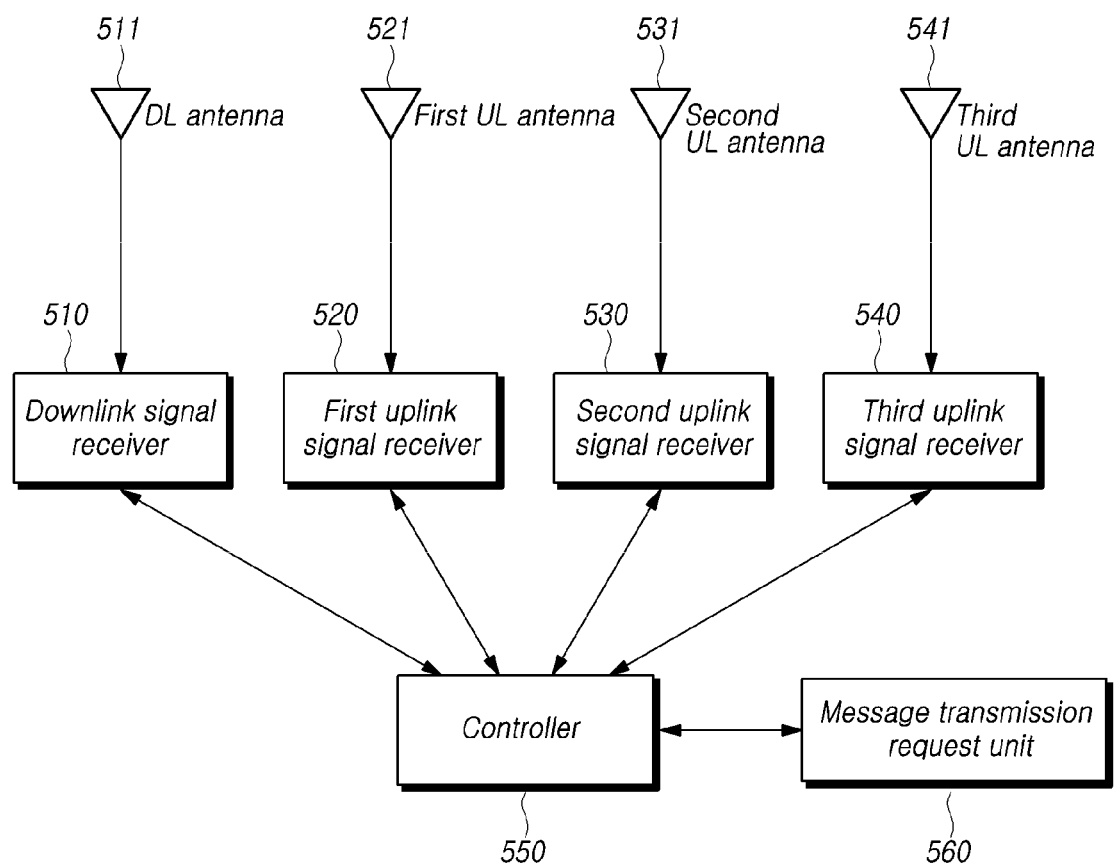
FIG. 5 illustrates a message transmission request apparatus according to yet another aspect of the present disclosure.

FIGS. 3 to 5 illustrate message transmission request apparatuses according to several aspects of the present disclosure. Specifically, FIGS. 3 to 5 illustrate situations where one or more antennas are connected with one or more uplink signal receivers and one or more downlink signal receivers. For discussing embodiments of FIGS. 3 to 5, it is assumed that an uplink resource assignment information acquisition unit is implemented by a downlink signal receiver.

FIG. 3 illustrates a message transmission request apparatus according to another aspect of the present disclosure.

Referring to FIG. 3, the message transmission request apparatus according to this embodiment may include a downlink signal receiver 310, an uplink signal receiver 320 and an antenna 350. Thus, the message transmission request apparatus according to this embodiment can receive signals of both uplink and downlink unlike the apparatuses illustrated in FIGS. 1 and 2.

In the structure of FIG. 3, signals of both uplink and downlink can be received via a single antenna. Further, this message transmission request apparatus can control the uplink signal receiver 320 and the downlink signal receiver 310 to interoperate with each other through a controller 330. When a terminal is placed in an adjacent location based on information through the uplink signal receiver, the controller can transmit a message through a message transmission request unit 340 to the terminal. The message transmission request unit in the above drawings requests a base station or a mobile communication network to transmit a message by being connected with the controller.

FIG. 4 illustrates a message transmission request apparatus according to further another aspect of the present disclosure.

Referring to FIG. 4, in the message transmission request apparatus as in FIG. 4, an antenna used in an uplink signal receiver 420 may be different from an antenna used in a downlink signal receiver 410. That is, a DL antenna 450 may be connected to the downlink signal receiver 410, and an UL antenna 460 may be connected to the uplink signal receiver 420. Further, in a manner similar to that of FIG. 3, the uplink signal receiver 420 and the downlink signal receiver 410 may be controlled to interoperate with each other by a controller 430.

When each of the uplink signal receiver and the downlink signal receiver uses an antenna different from each other, the uplink signal receiver and the downlink signal receiver may be located at respective different physical locations. Through this, compared with the message transmission request apparatus illustrated in FIG. 3, an advantage is produced of improving the reception performance of uplink and the reception performance of downlink. When a terminal is placed in an adjacent location based on information through the uplink signal receiver, the controller may transmit a message through a message transmission request unit 440 to the terminal.

FIG. 5 illustrates a message transmission request apparatus according to yet another aspect of the present disclosure.

Referring to FIG. 5, the message transmission request apparatus may include one downlink signal receiver 510 and one or more uplink signal receivers (520, 530, 540) One DL antenna 511 may be connection with the downlink signal receiver 510. Further, a first UL antenna 521, a second UL antenna 531, and a third UL antenna 541 may be connected with a first uplink signal receiver 520, a second uplink signal receiver 530, and a third uplink signal receiver 540, respectively. In a manner similar to those of FIGS. 3 and 4, a controller 550 can control the downlink signal receiver 510 and each uplink signal receiver (520, 530, 540) to interoperate with each other.

The downlink signal receiver of the message transmission request apparatus may be located in a location in which a downlink signal from a base station can be well received in the vicinity of a base station.

One or more uplink signal receivers can attempt, at respective locations, to receive an uplink signal transmitted by a terminal whose location is required to be measured to a base station. In this case, each uplink signal receiver may be connected with the controller, and be interoperable with the uplink signal receiver. Thus, each uplink signal receiver may operate by being associated with a downlink signal received via the downlink signal receiver.

When a terminal is placed in the vicinity based on information through the uplink signal receiver, the controller may transmit a message through a message transmission request unit 560 to the terminal. The message transmission request apparatus according to the embodiment of FIG. 5 includes a plurality of uplink signal receivers, and thus, respective different message transmission requests may be transmitted based on a signal intensity of each receiver and a location of a corresponding terminal. For example, a requesting message may be changed according to an uplink signal receiver through which a signal with a greatest intensity is detected. Further, time points at which messages are transmitted to the terminal may be set to be different from one another.

In another example, different messages may be transmitted according to locations based on detected locations. Further, different messages may be transmitted based on mobility.

The embodiments discussed above show that each of the downlink signal receiver and one or more uplink signal receivers is connected through a wired connection. However, all connections or a partial connection may be performed using a wireless link. In this case, communication between each receiver and the controller may be performed using a frequency different from frequencies used by the receivers of the present disclosure.

Meanwhile, although FIG. 5 illustrates the embodiment in which one downlink signal receiver and the plurality of uplink signal receivers are included; however, embodiments of the present disclosure are not limited thereto. For example, a plurality of downlink signal receivers may be included in the message transmission request apparatus, and in this case, each downlink signal receiver may be located at a different location from one another. Further, each downlink receiver and each uplink receiver may be installed to have a 1:1 correspondence. In this case, uplink resource assignment information can be acquired through respective downlink receivers, and using this, corresponding uplink receivers can receive an uplink signal transmitted by a terminal. In another example, one or more downlink receivers and one or more uplink receivers may be implemented to have a many-to-one or one-to-many correspondence.

Referring back to FIG. 2, when the uplink resource assignment information acquisition unit 210 acquires uplink resource assignment information, the uplink signal receiver 220 receives an uplink signal based on the uplink resource assignment information. The controller 230 determines information on a terminal which has transmitted the uplink signal based on the uplink signal, and determines whether to transmit a message to the terminal according to the information in the terminal. In one embodiment, based on an uplink signal, the controller 230 can determine at least one of identifier information of a terminal which has transmitted the uplink signal, uplink signal frequency information, uplink signal reception time information, uplink signal intensity information, and location information, and determine whether to transmit a message to the terminal according to at least one of the identification information of the terminal, the uplink signal frequency information, the uplink signal reception time information, the uplink signal intensity information, and the location information.

Specifically, the uplink resource assignment information acquisition unit can determine control information that may be transmitted from a base station to a terminal by receiving a forward signal, i.e. a downlink signal. In particular, the message transmission request apparatus can determine whether uplink control information may be transmitted by receiving control information connected with a radio network temporary identifier (RNTI) through the downlink signal receiver. That is, based on the control information, the message transmission request apparatus can determine whether the terminal may thereafter transmit an uplink signal to the base station.

The RNTI is used as a temporary ID of a terminal in a base station, and since an RNTI assigned to a terminal is not indicated in advance or not shared, anonymity can be maintained. Herein, the RNTI is employed for the purpose of identifying a terminal; however, embodiments of the present disclosure are not limited thereto. Herein, it should be noted that any ID temporarily assigned to a terminal in one base station or cell may be used for the same purpose or function as the RNTI. That is, a request for a message transmission to the terminal may be performed based on one or more of an identifier of a base station including a cell ID, an RNTI of a terminal, information of a frequency band on which an uplink signal is detected, and information on a time at which the uplink is detected.

That is, instead of measuring location information for any terminal, the apparatus of the present disclosure can acquire control information connected with a specific RNTI for measuring only location information of a terminal identified by a specific RNTI. When the RNTI is used as identification information of a terminal, an advantage is produced of specifying a terminal for measuring location information at a specific time without leaking personal information of a user (e.g. a phone number, a name, a serial number).

In the present disclosure, it is necessary to perform reception and demodulation for a downlink channel in order to acquire control information including uplink resource assignment transmitted on downlink. In the present disclosure, methods of receiving downlink control information are discussed.

As one of possible methods, demodulating and decoding unspecified multiple RNTIs may be performed. That is, since an RNTI assigned to a terminal is not shared, demodulating and decoding all possible control information may be performed. In the LTE system, one or more candidates of a location at which control information can be transmitted for each terminal are defined. Each terminal can receive control information through blind search for the candidates. That is, the message transmission request apparatus of the present disclosure can receive control information on RNTIs of unspecified multiple terminals for all possibilities that control information may be transmitted to terminals in a corresponding cell. In this process, the apparatus of the present disclosure can select control information with high reliability among control information received on downlink, and derive received RNTI information and additional control information through the received control information with high reliability. In this process, control information whose reliability is greater than or equal to a predetermined threshold value is regarded as having been normally received, and based on this, a corresponding RNTI and associated resource assignment information can be derived.

As described above, the complexity of the apparatus of the present disclosure may increase when receiving all possible control information on RNTIs of unspecified multiple terminals. To reduce such complexity, demodulation and decoding may be performed for only a limited number of candidates of possible control information.

Further, the message transmission request apparatus of the present disclosure may receive downlink control information on only a limited number of RNTIs. That is, the apparatus may set a limited number of RNTI candidates in advance, and then attempt to receive downlink control information on these candidates. That is, the apparatus may set one or more RNTI candidates in advance, and then attempt to receive forward control information on these.

In this process, RNTI candidates to be attempted to receive downlink control information may be selected in various methods. In one example, a base station may inform the apparatus of the present disclosure of one or more candidates. In another example, one or more candidates may be input to the apparatus of the present disclosure from the outside thereof, or be informed through one or more different communication channel(s). In further another example, one or more RNTI candidates may be defined in advance, and information collection may be performed for only such limited RNTI candidates. For example, RNTIs may be assigned to specific terminals in advance, and based on this, downlink control information on these may be received. In this case, these specific terminals may share information of the assigned RNTIs with a base station in advance, or receive them from the base station and operate with the respective assigned RNTIs. Through such methods, without receiving downlink control information on all RNTIs, by attempting to receive control information on a limited number of RNTIs, the complexity of corresponding operation may be reduced, or reliability of receiving downlink control information may be increased.

Based on this, the apparatus of the present disclosure can acquire information on a time at which an uplink signal may be transmitted and a resource on which an uplink signal may be transmitted. The apparatus of the present disclosure can attempt to receive an uplink signal transmitted by a terminal to a base station based on uplink resource assignment information acquired through such operation, and determine whether the uplink signal is transmitted based on a result obtained by attempting to receive the uplink signal. In this case, this determination may be performed by the controller 550.

The controller 550 can receive measurement results for a corresponding terminal from each uplink receiver, and determine a message transmission based on a result obtained by identifying a location of the terminal. Further, the controller 550 can determine a message transmission to the terminal based on a moving path or moving characteristics of the terminal for a predetermined time. Further, the controller 550 may request different message transmissions according to information on mobility of the terminal, such as, a location and a moving path of the terminal, and the like.

In another embodiment, the apparatus of the present disclosure may transmit detected location or mobility information of a terminal to a mobile communication base station or a mobile communication network. The mobile communication network or the base station can determine whether to transmit a message or whether to transmit a message to be transmitted based on this information, and transmit the message to the terminal based on this determination. In this case, a message, or a set of messages, to be transmitted between the apparatus of the present disclosure and the mobile communication network or the base station may be set in advance. Further, a transmission condition for each message may be set in advance. Such presetting may be performed between the apparatus of the present disclosure and the mobile communication network or the base station; however, embodiments of the preset disclosure are not limited thereto. For example, a message to be transmitted to the mobile communication network or the base station and a transmission condition for transmitting the message may be input to the apparatus of the present disclosure in advance.

Under such presetting, the apparatus of the present disclosure may provide the mobile communication network with identification information, such as an RNTI, or the like, and/or location information, and/or mobility information, of a terminal acquired by detecting an uplink signal. A time point at which the uplink signal has been detected, location information of the apparatus of the present disclosure which has detected the signal, frequency band information, and the like may be included in such information transmitted to the mobile communication network. In this case, without transmitting a message part in FIG. 9, the transmitting of location or mobility information of a terminal measured by the apparatus of the present disclosure may lead a same operation as the message transmission request to be performed.

The mobile communication network receiving the information converts the received identification information of the terminal, such as an RNTI, or the like, into the form of an identifier used for a message transmission such as a TMSI, or the like. Thereafter, the mobile communication network selects a message to be transmitted based on the location or mobility of the terminal, and transmits the selected message to the terminal by using the converted identifier. In this process, the mobile communication network selects and transmits a message among messages set in advance, based on the location and mobility information transmitted by the apparatus of the present disclosure.

If for a time period at which, or a frequency resource on which, it is indicated that an uplink signal is transmitted in control information, the transmission of data for the uplink signal from a terminal to a base station is detected through an uplink signal receiver, the message transmission request apparatus may determine that the terminal whose location is required to be measured is placed at a location adjacent to the message transmission request apparatus. Further, based on this, the message transmission request apparatus of the present disclosure may acquire information on whether the terminal is placed and an RNTI of the terminal. Through this process, the message transmission request apparatus of the present disclosure may identify an RNTI of a terminal placed in an adjacent location and whether the terminal is placed. When the apparatus of the present disclosure is installed at a specific location, it is possible to acquire whether a terminal making a call or transmitting and receiving data is placed in the vicinity of the apparatus, a frequency used by the terminal for communication, and RNTI information. Further, the apparatus of the present disclosure can request a corresponding base station to transmit a message to terminals located in the vicinity of a specific location based on a frequency and RNTI information.

Figure 6:
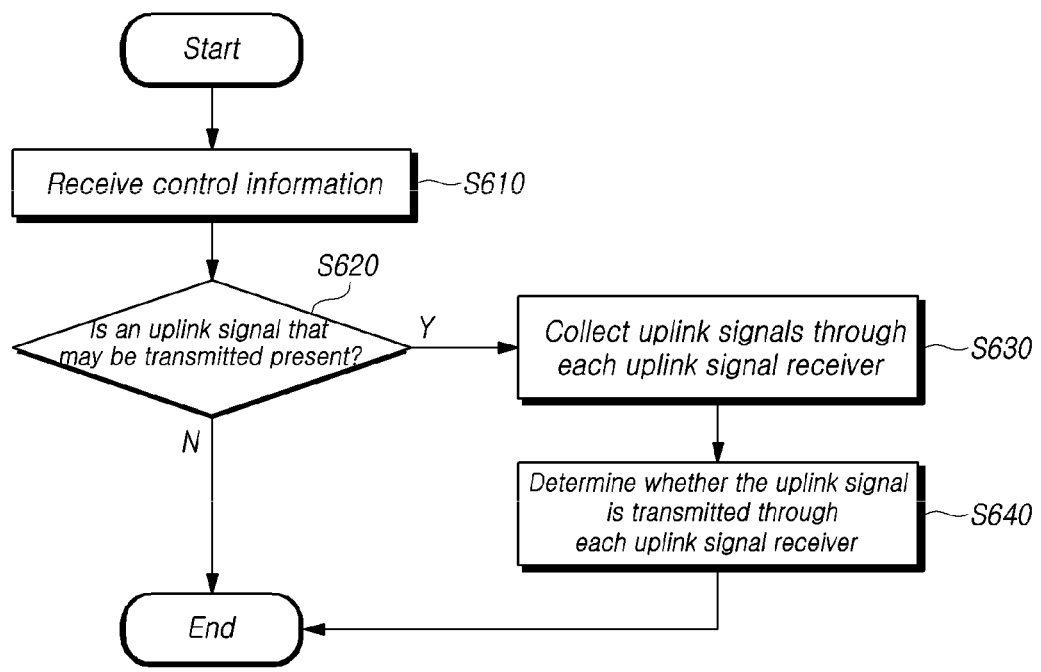
FIG. 6 is a flow chart illustrating the operation of a message transmission request apparatus according to aspects of the present disclosure.

In this case, methods of requesting a base station to transmit a message to terminals located within a predetermined distance from the apparatus of the present disclosure may be performed based on a frequency used by the terminal for communication and an RNTI, Thus, without information on personal information of a user of a terminal, a unique number of the terminal, and the like, the apparatus of the present disclosure can enable a message to be transmitted to unspecified terminals, while securing privacy of users. [98] FIG. 6 is a flow chart illustrating the operation of a message transmission request apparatus according to aspects of the present disclosure. Specifically, in FIG. 6, a procedure is provided of allowing the apparatus according to embodiments of the present disclosure to acquire uplink resource assignment information using a downlink signal receiver of mobile communication, and based on this, to determine whether a terminal is placed in the vicinity of the apparatus.

In another embodiment, a mobile communication base station directly may transmit uplink resource assignment information and RNTI information of terminals to the apparatus of the present disclosure, and based on this, the apparatus of the present disclosure can acquire uplink signal information.

In FIG. 6, the operation of the communication apparatus is discussed based on the LTE system as one example of mobile communication systems. The LTE system operates based on a TTI of 1 ms, and forward control information may be transmitted from a base station to a terminal for each TTI. Meanwhile, the procedure discussed below can be equally applicable to even other mobile communication systems other than the LTE system.

The message transmission request apparatus can receive control information transmitted from a base station to a terminal, at step S610.

The terminal can demodulate and decode one or more downlink signals for each TTI. At this time, the downlink signal received by the terminal from the base station may be control channel such as a PDCCH or a data channel such as a PDSCH. That is, in the LTE, control information may be normally transmitted through the PDCCH, and when the control information is transmitted through the PDSCH, the PDSCH may be received. In this case, the message transmission request apparatus of the present disclosure may receive a PDCCH of downlink first, and thereafter, attempt to receive a PDSCH based on the control information.

The message transmission request apparatus can receive a forward signal transmitted from a base station to a terminal, that is, a downlink signal, and thereafter, identify when an uplink may be transmitted and which resource the uplink may be transmitted over, and which RNTI the terminal has at that time.

Whether an uplink signal that may be transmitted through each uplink signal receiver for the uplink resource identified through this process is present may be identified, at step S620. This process may include to determine whether a terminal that may transmit an uplink is present, and which RNTI the terminal has, through control information transmitted on downlink. That is, when it is determined that an uplink signal transmission may be performed, each uplink signal receiver can collect an uplink signal transmitted to a base station through a corresponding uplink resource, and based on the collected uplink signal, determine whether the uplink signal is transmitted. If the reception of an uplink signal of a terminal with a corresponding RNTI is detected, it can be regarded that the terminal is placed in the vicinity of the message transmission request apparatus of the present disclosure.

When it is determined that an uplink signal transmission may be performed, at step S620-Y, each of one or more uplink signal receivers included in the communication apparatus can collect an uplink signal, and attempt to receive the uplink signal, at step S630. Further, the message transmission request apparatus can determine whether an uplink signal is transmitted through each uplink signal receiver, at step S640.

On the contrary, when it is determined that an uplink signal transmission may not be performed, at step S620-N, the message transmission request apparatus waits until next control information is received without performing a separate uplink signal collecting operation.

This operation may be performed subsequently for each TTI. Further, the message transmission request apparatus can identify whether a terminal is placed, a location of the terminal, and mobility information based on the presence or absence of the uplink signal transmission, which is determined based on the signal collected by each uplink signal receiver.

Figure 7:
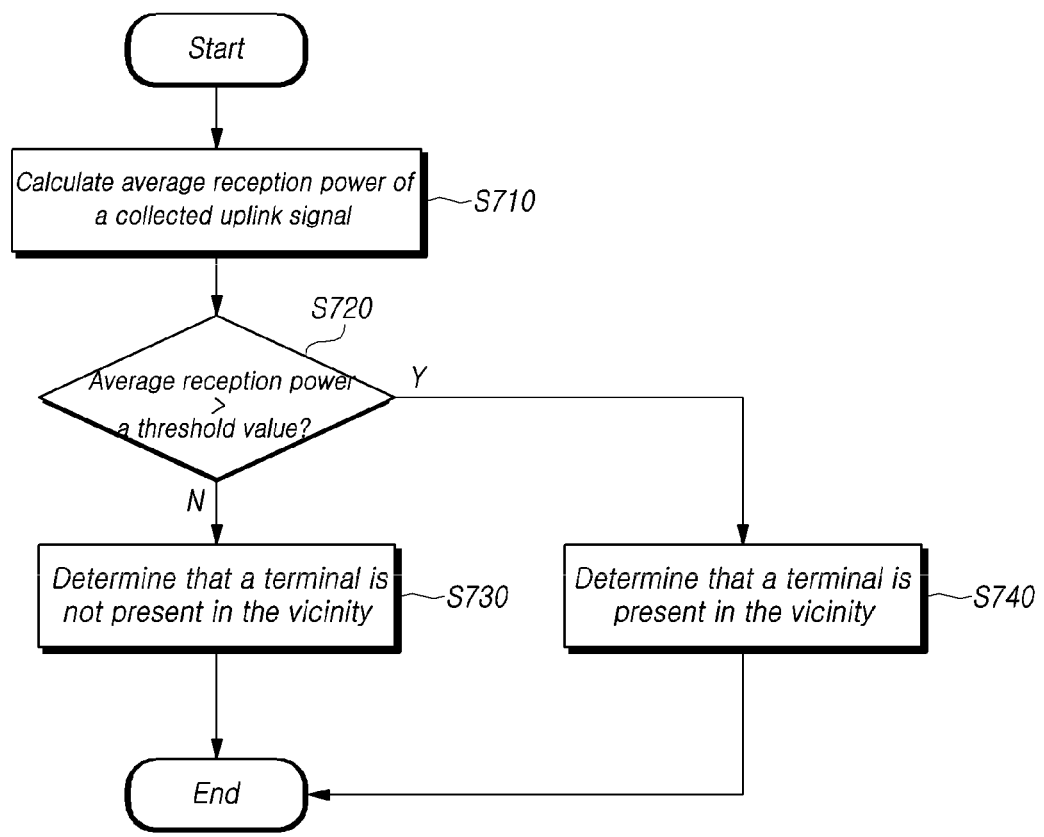
FIG. 7 is a flow chart illustrating that a message transmission request apparatus detects the presence or absence of an uplink signal according to aspects of the present disclosure.

FIG. 7 is a flow chart illustrating that a message transmission request apparatus detects the presence or absence of an uplink signal according to aspects of the present disclosure.

Referring to FIG. 7, the message transmission request apparatus may acquire transmission information of uplink from a reception signal of uplink acquired through a downlink signal receiver. Thereafter, based on the acquired uplink transmission information, the message transmission request apparatus may collect an uplink signal transmitted from a terminal to a base station through a resource assigned on uplink, and can calculate average reception power of the collected signal, at step S710.

The message transmission request apparatus can compare a calculated average reception power value with a threshold value calculated or set in advance, at step S720. Since the uplink signal has been received when the average reception power value is greater than the threshold value through the comparing, at step S720-Y, it can be determined that a terminal whose location is required to be measured is placed in the vicinity of the apparatus, at step S740. On the contrary, since the uplink signal is not received when the average reception power value is smaller than the threshold value, at step S720-N, it can be determined that a terminal whose location is required to be measured is not placed in the vicinity of the apparatus, at step S730.

In the above process, power of a reference signal which is a pilot signal transmitted over uplink PUCCH or PUSCH may be used for calculating a reception power value of the uplink. In another example, power of a data signal transmitted over uplink PUCCH or PUSCH may be used for calculating a reception power value of the uplink. Further, it is possible to identify whether a terminal is placed and location information of the terminal by combining power values of the reference signal and the data signal.

Figure 8:
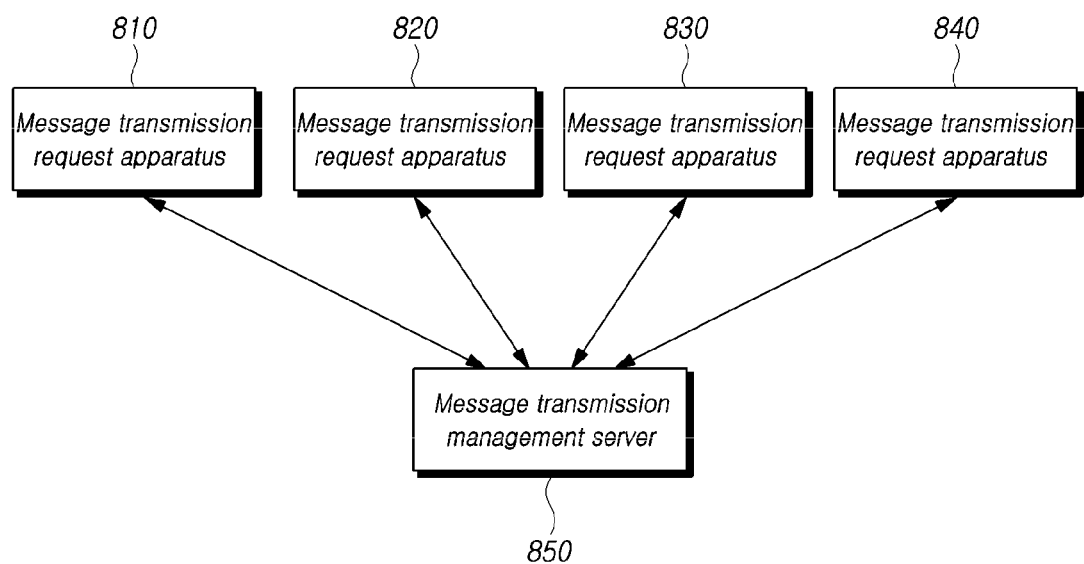
FIG. 8 illustrates communication between a message transmission request apparatus and a message transmission management server according to aspects of the present disclosure.

FIG. 8 illustrates communication between a message transmission request apparatus and a message transmission management server according to aspects of the present disclosure.

In an embodiment of FIG. 8, message transmission request apparatuses (810, 820, 830, 840) of the present disclosure can perform communication wirelessly or in a wired connection with a message transmission management server using respective communication units included in apparatuses. Each message transmission request apparatus of the present disclosure may transmit uplink signal reception intensity information of an uplink signal received by an uplink signal receiver to the message transmission management server.

Further, a receiver of the message transmission management server 850 can receive uplink signal reception intensity information of an uplink signal received by each of one or more message transmission request apparatuses. A controller of the message transmission management server 850 can determine a location of a terminal which has transmitted the uplink signal based on the uplink signal reception intensity information of the uplink signal received by each of one or more message transmission request apparatuses. At this time, the controller may determine a location of the terminal using triangulation based on the uplink signal reception intensity information of the uplink signal received by each message transmission request apparatus and location information of the message transmission request apparatus. Further, a transmitter of the message transmission management server 850 can transmit the location information of the terminal to the one or more message transmission request apparatuses.

A communication unit of the message transmission request apparatus of the present disclosure can receive the location information of the terminal which has transmitted an uplink signal from the message transmission management server, and a controller thereof can determine whether to transmit a message to the terminal based on the received location information of the terminal.

In this process, the message transmission management server 860 may directly transmit a message transmission request to a base station or a mobile communication network.

Although not shown in FIG. 8, message transmission request apparatuses (810, 820, 830, 840) of the present disclosure may perform communication wirelessly or in a wired connection with one or more other message transmission request apparatuses using respective communication units included in apparatuses. Accordingly, in another embodiment, the message transmission request apparatus of the present disclosure may receive uplink signal reception intensity information of an uplink signal transmitted by a terminal from one or more adjacent message transmission request apparatuses placed within a second threshold distance from the message transmission request apparatus, and the controller can determine location information of the terminal based on the uplink signal reception intensity information of the uplink signal received from the adjacent message transmission request apparatuses and uplink signal reception intensity information of an uplink signal received by the uplink signal receiver.

Referring back to FIG. 2, the controller 230 of the present disclosure may determine whether to transmit a message to a terminal based on information on the terminal. That is, the controller 230 may determine whether a terminal of an RNTI corresponding to a received uplink signal satisfies a message transmission condition set in advance. When the terminal of the RNTI satisfies the message transmission condition set in advance, a message transmission request signal may be transmitted to a base station or a mobile communication network. On the contrary, even though an uplink signal reception of the terminal of the RNTI has been detected, when the message transmission condition set in advance is not satisfied, the message transmission request signal may not be transmitted.

The message transmission condition set in advance may include a distance within a predetermined distance, that is, a case where the distance is within the predetermined distance. Further, the transmission condition may be a received RSSI greater than or equal to a predetermined value, that is, a case where the received RSSI is greater than or equal to the predetermined value. Here, to measure more accurately a location of a terminal, the transmission condition may be set by including information on a direction at which an uplink signal is received. Further, the transmission condition may be a time range in which the terminal of the RNTI is detected. Further, the transmission condition may be based on a data pattern of uplink transmitted, or downlink received, by the terminal of the RNTI. In one example, the transmission condition of the present disclosure may include that the frequency of signal transmissions on uplink is greater than or equal to a predetermined value, that is, a case where the frequency of signal transmissions on uplink is greater than or equal to the predetermined value. Further, as the transmission condition, a message transmission may be requested only for an RNTI which has been detected and for which a message transmission request have not been performed, during a recent certain period. These message transmission conditions are some examples of possible conditions. Thus, the message transmission request apparatus of the present disclosure is not limited to these specific conditions, and may determine whether to transmit a message, according to situations of the message transmission request apparatus to which any condition is applied, based on any one of these conditions, any combinations thereof, or other information acquired from an uplink signal.

Specifically, when a terminal is located within a first threshold distance from the message transmission request apparatus, the controller may determine to transmit a message to the terminal. The above process may be performed based on information on an RNTI of a terminal. That is, by determining whether an uplink signal to be transmitted only by a terminal with a specific RNTI is transmitted, the message transmission request apparatus can request a base station or a mobile communication system to transmit a message when it is determined that the terminal is located in the vicinity of the message transmission request apparatus based on the determination as to whether the terminal with the specific RNTI is placed. Further, characteristics of a location and mobility of a terminal may be acquired from an uplink signal of the terminal whose presence is identified.

The message transmission request apparatus in this process can acquire resource assignment information and RNTI information of a terminal to which a resource for an uplink transmission is assigned. This information may be acquired by receiving a downlink of the mobile communication system, or by receiving information from the outside. For example, such information may be received from a base station of a mobile communication network. This may be provided by using a signal directly transmitted to the apparatus of the present disclosure, not a signal wirelessly transmitted from the mobile communication system to a terminal. The message transmission request apparatus of the present disclosure can determine whether the terminal of the RNTI transmits a signal on the assigned uplink transmission. A determination on whether the terminal of the RNTI transmits a signal within a certain distance from the apparatus may be performed based on the presence or absence of the signal transmitted by the terminal on uplink of a mobile communication system or a level of the received signal.

In one embodiment, the controller 230 may determine to transmit a message to the terminal when an intensity value according to uplink signal reception intensity information is greater than or equal to a first intensity threshold value. That is, the message transmission request apparatus of the present disclosure can perform such a determination based on an intensity of a signal transmitted by the terminal at a location at which an uplink resource is assigned. When an intensity of a signal transmitted by the terminal of the RNTI required to be detected on the uplink resource is greater than or equal to a predetermined threshold value, it can be determined that the terminal is placed in the vicinity of the apparatus. The threshold value may be differentially applied according to a distance at which a terminal required to be detected is located. A signal transmitted on uplink or a sounding reference signal (SRS) may be used for this detection process. Further, a control channel transmitted on uplink such as a PUCCH may be used for the detection process. Further, the determination process may be performed based on a signal of a data channel transmitted on uplink such as a PUSCH.

In one embodiment, the controller 230 of the present disclosure can determine types of messages to be transmitted to a terminal using at least one of identification information of the terminal, uplink signal frequency information, uplink signal reception time information, uplink signal intensity information, and location information. Further, types of messages to be transmitted may be determined based on information on mobility of a terminal during a predetermined time, as well as location information of the terminal.

For example, types of messages to be transmitted to a terminal may be determined according to a location of the terminal or a change in a location of the terminal during a predetermined time. An advertisement message or a notification message may be included in the types of messages to be transmitted. In one example, such messages may include an advertisement message related to a place corresponding to a location of a message transmission request terminal, or a notification message for an occurrence of an emergency situation. However, types of messages according to embodiments of the present disclosure are not limited thereto; thus, a type of a message may be changed according to a situation in which a message is transmitted.

FIG. 9 illustrates the configuration of a message transmission request signal transmitted by a message transmission request apparatus according to aspects of the present disclosure.

When determining to transmit a message to a terminal, the message transmission request unit 240 of the present disclosure may transmit, to a base station, a message transmission request signal including at least one of operator identifier information, identifier information of the terminal, uplink signal frequency information, uplink signal reception time information, and message information.

Referring to FIG. 9, at least one of an operator ID, a frequency band used by a terminal to which the message is transmitted (an uplink band, a downlink band, or uplink and downlink bands), location information of a base station including a cell ID, information on time at which a signal of the terminal is detected, temporary identification information of the terminal such as an RNTI, identification information of a sender (a phone number, etc.), and a message to be transmitted may be used as a parameter used for the message transmission request.

In some examples of the present disclosure, a message is transmitted to a terminal using a frequency band used by a terminal and/or an RNTI. That is, a request may be performed for transmitting a message to a terminal receiving a corresponding RNTI in any frequency band. Since an operator is determined in case a frequency band used in most configurations is dedicated, an ID for identifying a corresponding operator may be omitted. Further, when a terminal detecting a signal directly requests a message transmission from a base station to which the terminal belongs, the location information of the base station may be omitted.

In the above process, the reason that the apparatus of the present disclosure transmits information on a time at which a signal of the terminal is detected to the base station is that temporary identification information of a terminal such as the RNTI is not a fixed value, but variable information used while a certain service is remained. That is, as the time information at which the signal of the terminal is detected is transmitted to the base station, the base station can identify a terminal to which a corresponding RNTI is assigned in a specific frequency band at a specific time and transmit a message to the terminal.

Since the cell ID in the above message is an ID of a base station that can be acquired through a synchronization channel and a BCH in the LTE, and is reused every predetermined distance, a location of the apparatus of the present disclosure that has detected a terminal to which the message is required to be transmitted may be additionally transmitted. For example, the apparatus of the present disclosure may be provided with a device capable of measuring a location, such as a global positioning system (GPS), or the like, and then, information acquired by measuring a location of the apparatus of the present disclosure using such a device may be transmitted. When the apparatus of the present disclosure is used for transmitting a message only to a terminal placed in one base station, or requests a message transmission from a base station placed at a location at which a terminal to which a message is required to be transmitted is placed, the location information may be omitted. Further, the message may be transmitted by being included in a corresponding transmission request only when location information is needed, otherwise the location information may be additionally transmitted.

Further, a message in a message transmission request according to the present disclosure may be registered in a base station or a mobile communication system in advance, and in this case, the message transmission request may be performed by omitting the message part. Further, when multiple messages can be transmitted, the multiple messages may be registered in a base station or a mobile communication system in advance, and only numbers for identifying multiple messages may be included and transmitted in a message transmission request.

The message transmission request may be wirelessly transmitted to mobile communication systems or base stations through a mobile communication system such as the LTE. Further, the apparatus of the present disclosure may be connected to a communication network through a wired connection, and the request may be transferred to a mobile communication system using the wired communication network.

As described above, the message transmission request apparatus of the present disclosure includes an uplink resource assignment information acquisition unit acquiring uplink resource assignment information, one or more uplink signal receivers receiving an uplink signal based on the uplink resource assignment information, a controller determining, based on the received uplink signal, whether an uplink signal transmitted by a terminal to a base station is present, determining the presence or absence of the terminal and location information, and determining whether the detected terminal satisfies a message transmission condition set in advance, and a message transmission request unit transmitting a message transmission request signal to a base station for requesting the base station to transmit a message to the terminal satisfying the message transmission condition. Thus, without information on personal information of a user of a terminal, a unique number of the terminal, and the like, the apparatus of the present disclosure can enable a message to be transmitted to unspecified terminals, while securing privacy of users.

Figure 10:
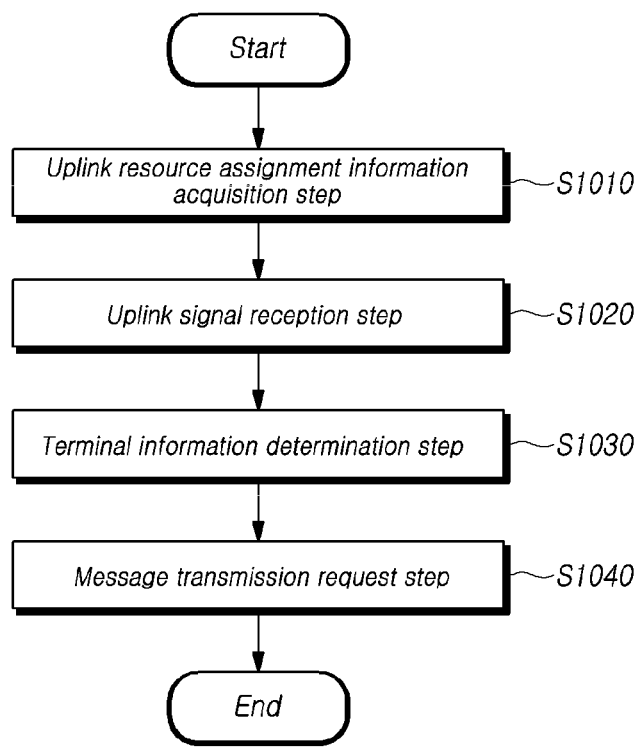
FIG. 10 is a signal flow illustrating a message transmission request method according to aspects of the present disclosure.

FIG. 10 is a signal flow illustrating a message transmission request method according to aspects of the present disclosure.

In accordance with one aspect of the present disclosure, a message transmission request method including an uplink resource assignment information acquisition step S1010 of acquiring uplink resource assignment information, an uplink signal reception step S1020 of receiving an uplink signal based on the uplink resource assignment information, a terminal information determination step S1030 of determining information on a terminal including identifier information and location information of the terminal which has transmitted the uplink signal based on the uplink signal, and a message transmission request step S1040 of transmitting the information on the terminal to a base station.

In accordance with another aspect of the present disclosure, a message transmission request method including an uplink resource assignment information acquisition step S1010 of acquiring uplink resource assignment information, an uplink signal reception step S1020 of receiving an uplink signal based on the uplink resource assignment information, a terminal information determination step S1030 of determining information on a terminal which has transmitted the uplink signal based on the uplink signal, and a message transmission request step S1040 of transmitting a message transmission request signal to a base station for requesting the base station to transmit a message to the terminal.

In one embodiment, in the uplink resource assignment information acquisition step S1010, a message transmission request apparatus can receive a downlink signal, and acquire uplink resource assignment information by processing the downlink signal.

Specifically, in the uplink resource assignment information acquisition step S1010, the message transmission request apparatus can acquire control information by performing blind search for a candidate location at which control information may be transmitted among downlink signals, and acquire uplink resource assignment information by processing the downlink signal, and based on the control information, can acquire identifier information of a terminal and uplink resource assignment information of the terminal.

Further, the message transmission request apparatus can select control information with reliability that is greater than or equal to a reliability threshold value among downlink signals, and based on the selected control information, acquire the identifier information of the terminal and the uplink resource assignment information of the terminal.

In the step 1030 of determining whether a message transmission is required, based on an uplink signal, the message transmission request apparatus can determine at least one of identifier information of a terminal which has transmitted the uplink signal, uplink signal frequency information, uplink signal reception time information, uplink signal intensity information, and location information, and determine whether to transmit a message to the terminal according to at least one of the identifier information of the terminal, the uplink signal frequency information, the uplink signal reception time information, the uplink signal intensity information, and the location information.

Further, in the step 1030 of determining whether a message transmission is required, when a location of the terminal is within a first threshold distance from the message transmission request apparatus, the message transmission request apparatus may determine that a message transmission to the terminal is required. In another example, the message transmission request apparatus may determine whether a message transmission to the terminal is required according to whether a received RSSI is greater than or equal to a predetermined value, according to which range a time at which the terminal is detected belongs in, according to a data pattern of uplink or downlink, or according to the frequency of uplink signal transmissions.

In one embodiment, in the step 1030 of determining whether a message transmission is required, types of messages to be transmitted to the terminal may be determined by using at least one of the identifier information of the terminal, the uplink signal frequency information, the uplink signal reception time information, the uplink signal intensity information, and the location information. For example, types of messages to be transmitted to the terminal may be determined according to a location of the terminal or a change in the location of the terminal during a predetermined time. Such types of messages may include an advertisement message related to a place corresponding to a location of a message transmission request terminal, or a notification message for an occurrence of an emergency situation. However, types of messages according to embodiments of the present disclosure are not limited thereto; thus, a type of a message may be changed according to a situation in which a message is transmitted.

In one embodiment, the message transmission request method of the present disclosure may further include a communication step of receiving uplink signal reception intensity information of an uplink signal transmitted by a terminal from one or more adjacent message transmission request apparatuses placed within a second threshold distance from the message transmission request apparatus, and in the step 1030 of determining whether a message transmission is required, location information of the terminal may be determined based on the uplink signal reception intensity information of the uplink signal received from the adjacent message transmission request apparatuses and uplink signal reception intensity information of an uplink signal received by the uplink signal receiver. That is, the message transmission request apparatus can determine the location of the terminal by combining the uplink signal reception intensity information of the uplink signal received from the adjacent message transmission request apparatuses and the uplink signal reception intensity information of the uplink signal received by the uplink signal receiver.

In another embodiment, the message transmission request method of the present disclosure may further include a communication step of transmitting uplink signal reception intensity information of an uplink signal received by the uplink signal receiver to a message transmission management server, and receiving location information of a terminal that has transmitted the uplink signal from the message transmission management server. In this case, the message transmission management server may receive information on the uplink signal from one or more message transmission request apparatuses, and determine a location of the terminal by analyzing a relationship between the received information. The determined location of the terminal may be transmitted to one or more message transmission request apparatuses.

In the message transmission request step S1040, when determining to transmit a message to a terminal, a message transmission request signal including at least one of operator identifier information, identifier information of the terminal, uplink signal frequency information, uplink signal reception time information, and message information may be transmitted to a corresponding base station.

According to the message transmission request method of the present disclosure, the message transmission request apparatus can acquire uplink resource assignment information, receive an uplink signal based on the uplink resource assignment information, determine, based on the received uplink signal, whether an uplink signal transmitted by a terminal to a base station is present, determine the presence or absence of the terminal and location information, determine whether the detected terminal satisfies a message transmission condition set in advance, and transmit a message transmission request signal to a base station so that the base station can transmit a message to the terminal satisfying the message transmission condition. Thus, according to the message transmission request method of the present disclosure, without information on personal information of a user of a terminal, a unique number of the terminal, and the like, a message can be transmitted to unspecified terminals, while securing privacy of users.

Figure 11:
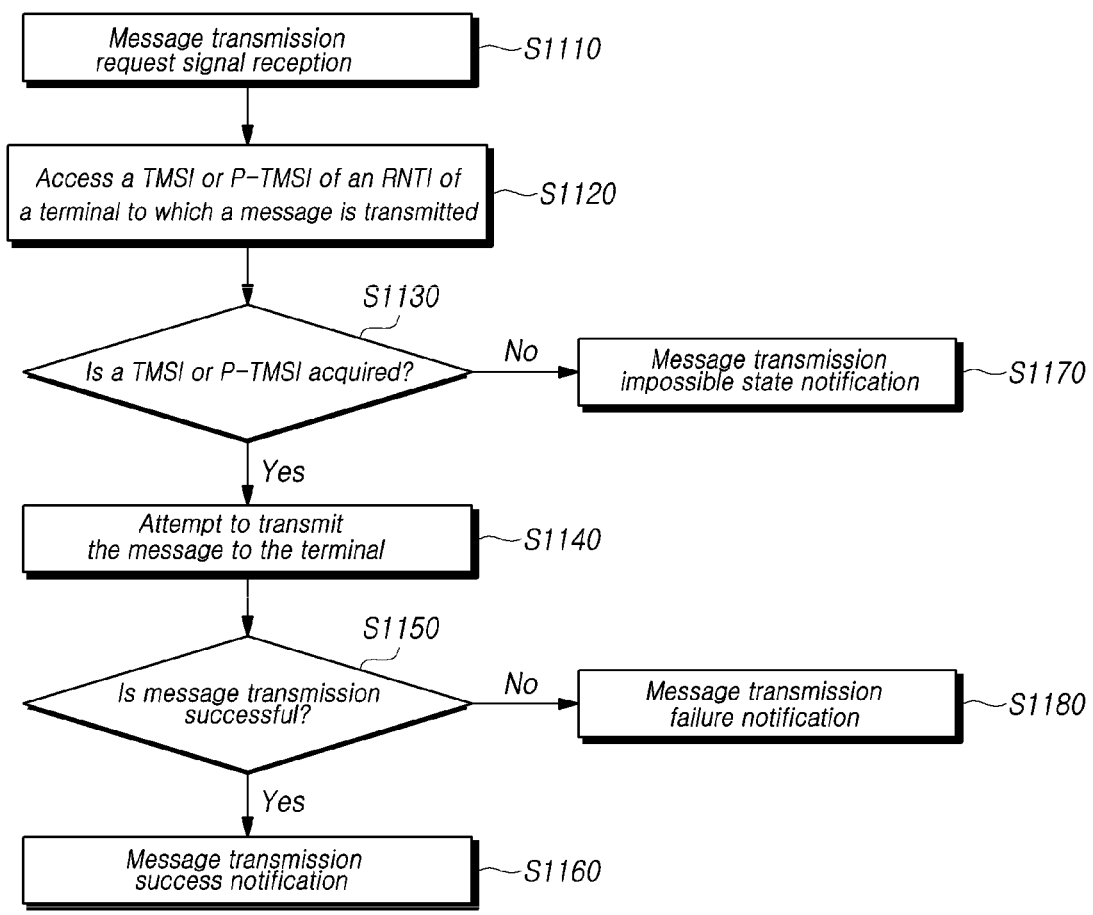
FIG. 11 is a flow chart illustrating the operation of a base station according to aspects of the present disclosure.

FIG. 11 is a flow chart illustrating the operation of a base station according to aspects of the present disclosure.

The base station of the present disclosure denotes a broad range of communication equipment including a mobile communication network, and should be interpreted as a generic term including an eNode-B, an MME/S-GW, and the like that transmit a signal to a terminal.

A receiver of the base station can receive a message transmission request signal from one or more message transmission request apparatuses of the present disclosure, at step S1110. The base station receiving the message transmission request signal can transmit a message to a terminal with an RNTI transmitted in a corresponding frequency band.

The base station of the present disclosure can transmit a message such as a SMS to the terminal by using an international mobile subscriber identity (IMSI) or a temporary mobile station identity (TMSI) of the terminal requested to transmit a message. In this case, a controller of the base station can access IMSI or TMSI information of the terminal using the corresponding RNTI in the frequency band related to the requested signal, at step S1120. When the base station identifies the IMSI or TMSI of the terminal, at step S1130, a transmitter of the base station can transmit a message responsive to the message transmission request signal to the terminal using this, at step S1140.

In this case, since the RNTI is information assigned to a terminal while a service of a base station (eNode-B or Node-B) is remained, that is, in a short time period, a terminal using the RNTI may be changed as time elapses. In this case, a corresponding message cannot be transmitted to the terminal. To address this issue, the base station (eNode-B or Node-B) can store correspondence information between an RNTI and a TMSI (or a P-TMSI) during a predetermined time. The predetermined time may be set as a time period, such as 3 hours, 1 day, or the like. Further, the predetermined time may depend on a storage capacity of a memory of the base station (eNode-B or Node-B).

In the above process, the base station or the mobile communication network identifies whether a transmission condition set in advance is satisfied for the terminal to which a message is transmitted according to the message transmission request, and transmits the message when the condition is satisfied. This transmission condition may be set differently from a transmission condition used for identifying in the apparatus of the present disclosure. For example, after identifying whether a user of a terminal to which the message is desired to be transmitted has admitted receiving messages according to the present disclosure, a message may be transmitted only to a terminal allowed to receive the message. Further, after identifying which specific group an owner of a terminal to which the message is desired to be transmitted belongs in, a message may be transmitted or not transmitted according to this. Further, a type of a message to be transmitted may be changed, or selected, and transmitted according to the information on the group. For example, a specific association may be an example of the group, and in this case, a determination may be performed as to whether an owner of a terminal to which the message is desired to be transmitted is a member of the specific association. In another example, such a group may be formed according to information or interests desired by an owner of a terminal. Further, whether a message is desired to be transmitted, or a message to be transmitted, may be changed by identifying whether an owner of a terminal belongs in two or more groups.

When the base station (eNode-B or Node-B) receiving the message transmission request stores a TMSI (or a P-TMSI), since the time at which the apparatus of the present disclosure has detected the terminal is within the predetermined time, the base station can search a TMSI of the terminal based on a correspondence table between a stored RNTI and the TMSI. If this search is successfully conducted, a message requested to be transmitted can be transmitted to the terminal having the TMSI. If the message is successfully transmitted, the base station can provide this to the apparatus that has requested the message transmission. If the search has not been successfully conducted, or TMSI information is not remained due to an elapsed time, a corresponding message cannot be transmitted. In this case, information on a failure to transmit a corresponding message may be provided to the apparatus that has requested the message transmission, at step S1170.

When an eNode-B manages an IMSI or a TMSI of the terminal and can generate a message required to be transmitted, the eNode-B can generate the message and transmit it to the terminal. When the eNode-B cannot perform such functions, this operation may be performed through inter-operating with an MME/S-GW end, and the like. In this case, when information on the IMSI or TMSI is needed, information of the terminal being registered in the VLR/HLR, and the like may be accessed and used.

The mobile communication network receiving the message transmission request according to the present disclosure can transfer the transmission request to a base station (eNode-B, or Node-B) placed in location information included in the message. If the corresponding base station (eNode-B or Node-B) receives the transmission request, without such a transferring process, the base station can perform the message transmission.

In the mobile communication system, the eNode-B (Node-B in the 3G system) of the base station manages RNTIs. Further, normally, the eNode-B or Node-B has information on a TMSI or a P-TMSI of a terminal. The base station (eNode-B or Node-B) can transmit a message to a terminal by using the TMSI or the P-TMSI. To do this, the base station can access and acquire a TMSI (or a P-TMSI) of a terminal to which an RNTI is assigned in the message transmission request. The transmitter of the base station can transmit a message to be transmitted to the terminal to the terminal using the accessed TMSI (or P-TMSI). This may be performed by a process equal to a typical message transmission process.

If the message is successfully transmitted, the transmitter of the base station can provide information on the successful transmission to the apparatus of the present disclosure that has performed the message transmission request, at step S1160. In this process, the message transmitted by the transmitter of the base station is corresponded to the message requested to be transmitted by the apparatus of the present disclosure. The message may be transmitted in the form of an SMS to the terminal. In another example, the message may be transmitted through an application program of the terminal. If the message has not been successfully transmitted, the transmitter of the base station can provide information on the failure of the message transmission to the apparatus of the present disclosure that has performed the message transmission request.

In the present disclosure, embodiments of transmitting a message to a terminal based on a TMSI (or a P-TMSI) are discussed; however, it should be noted that the above processes may be applicable to a system using an IMSI without a wide range of modifications, that is, only by a limited modification. In this case, a process of accessing the IMSI may be added in the above processes for allowing the base station to access the IMSI.

The terms "system", "processor", "controller", "component", "module", "interface", "model", "unit", and the like, may generally refer to computer-related entity hardware, a combination of hardware and software, software, or software in execution. For example, such elements described above may be, but not limited to, a process driven by the processor, a control processor, an entity, a running thread, a program and/or a computer. For example, when an application runs on a controller or a processor, all of the application, the controller or the processor can become one element. One or more components can be included within a process and/or thread of execution, and a component can be placed on one system or be disposed on more than one system.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

CROSS-REFERENCE TO RELATED APPLICATION

If applicable, this application claims priority under 35 U.S.C § 119(a) of Patent Application No. 10-2018-0076925 filed on Jul. 3, 2018, Patent Application No. 10-2018-0081013 filed on Jul. 12, 2018, Patent Application No. 10-2018-0122514 filed on Oct. 15, 2018, and Patent Application No. 10-2019-0079710 filed on Jul. 2, 2019 in Korea, the entire contents of which are incorporated herein by reference. In addition, this non-provisional application claims priorities in countries other than the U.S. for the same reason based on the Korean Patent Applications, the entire contents of which are hereby incorporated by reference.

What is claimed is:

1. A message transmission request apparatus comprising:
   an uplink resource assignment information acquisition unit configured to acquire uplink resource assignment information;
   one or more uplink signal receivers configured to receive an uplink signal transmitted from a terminal to a base station based on the uplink resource assignment information;
   a controller configured to determine, based on the uplink signal, information on the terminal including identifier information of the terminal which has transmitted the uplink signal and location information of the terminal; and
   a message transmission request unit configured to transmit the information on the terminal to a mobile communication network.

2. The message transmission request apparatus according to claim 1, wherein the uplink resource assignment information acquisition unit receives at least one downlink signal, and acquires the uplink resource assignment information by processing the at least one downlink signal.

3. The message transmission request apparatus according to claim 2, wherein the uplink resource assignment information acquisition unit acquires control information by performing blind search for a candidate location at which there is a possibility that control information is transmitted among the at least downlink signal, and acquires the identifier information of the terminal and the uplink resource assignment information of the terminal based on the control information.

4. The message transmission request apparatus according to claim 3, wherein the uplink resource assignment information acquisition unit selects control information whose reliability is greater than or equal to a predetermined threshold value, and acquires the identifier information of the terminal and the uplink resource assignment information of the terminal based on the selected control information.

5. The message transmission request apparatus according to claim 1, wherein the identifier information of the terminal is an RNTI.

6. The message transmission request apparatus according to claim 1, wherein the controller determines, based on the uplink signal, the identifier information of the terminal which has transmitted the uplink signal, uplink signal frequency information, uplink signal reception time information, and the location information.

7. The message transmission request apparatus according to claim 1, wherein the message transmission request unit transmits the information on the terminal to the mobile communication network so that the mobile communication network that stores respective messages to be transmitted according to different locations of the terminal in advance transmits a message corresponding to the location information of the terminal included in the information on the terminal to the terminal.

8. The message transmission request apparatus according to claim 1, wherein the message transmission request unit transmits the information on the terminal to the mobile communication network when a location of the terminal is within a first threshold distance from the message transmission request apparatus.

9. The message transmission request apparatus according to claim 8, wherein when uplink signal reception intensity information is greater than or equal to a first signal intensity threshold value, the controller determines that the location of the terminal is within the first threshold distance from the message transmission request apparatus.

10. The message transmission request apparatus according to claim 1, further comprising a communication unit configured to receive uplink signal reception intensity information of the uplink signal transmitted by the terminal from one or more adjacent message transmission request apparatuses placed within a second threshold distance from the message transmission request apparatus,
    wherein the controller determines the location information of the terminal based on the uplink signal reception intensity information of the uplink signal received from the one or more adjacent message transmission request apparatuses and uplink signal reception intensity information of the uplink signal received by the one or more uplink signal receivers.

11. The message transmission request apparatus according to claim 1, further comprising a communication unit configured to transmit uplink signal reception intensity information of the uplink signal received by the one or more uplink signal receivers to a message transmission management server so that the message transmission management server determines a location of the terminal that has transmitted the uplink signal.

12. A message transmission management server comprising:
    a receiver configured to receive uplink signal reception intensity information on an uplink signal received by each of one or more message transmission request apparatuses, from the each of one or more message transmission request apparatuses;
    a controller configured to determine a location of a terminal which has transmitted the uplink signal based on the uplink signal reception intensity information on the uplink signal received by each of the one or more message transmission request apparatuses; and
    a transmitter configured to transmit information on the location of the terminal to the one or more message transmission request apparatuses,
    wherein the uplink signal is transmitted from the terminal to a base station.

13. A mobile communication network comprising:
    a receiver configured to receive information on a terminal including identifier information and location information of the terminal from a message transmission request apparatus;
    a controller configured to access the identifier information of the terminal included in the information on the terminal; and
    a transmitter configured to, when the terminal corresponding to the identifier information of the terminal is accessed, transmit a message corresponding to the location information of the terminal included in the information on the terminal to the terminal,
    wherein the information on the terminal is obtained based on an uplink signal transmitted from the terminal to a base station.

14. The mobile communication network according to claim 13, wherein when a terminal corresponding to the identifier information of the terminal is not accessed, the transmitter transmits a message transmission failure signal to the message transmission request apparatus.

15. The mobile communication network according to claim 13, wherein the controller stores messages to be transmitted according to different locations of the terminal in advance.

16. The mobile communication network according to claim 13, wherein the controller accesses a second identifier information corresponding to the identifier information of the terminal included in the information on the terminal, and when the second identifier information is accessed, the transmitter transmits the message to the terminal using the second identifier information.

\* \* \* \* \*